H. W. HUNT.
TRANSMISSION MECHANISM FOR MACHINE TOOLS.
APPLICATION FILED NOV. 6, 1919.

1,400,361.

Patented Dec. 13, 1921.
5 SHEETS—SHEET 1.

Fig. 1.

Inventor
Howard W. Hunt
By Word & Word
Attorneys

Fig. 2.

H. W. HUNT.
TRANSMISSION MECHANISM FOR MACHINE TOOLS.
APPLICATION FILED NOV. 6, 1919.

1,400,361.

Patented Dec. 13, 1921.

Inventor
Howard W. Hunt
By Wood & Wood
Attorneys

UNITED STATES PATENT OFFICE.

HOWARD W. HUNT, OF CINCINNATI, OHIO, ASSIGNOR TO THE G. A. GRAY COMPANY, OF CINCINNATI, OHIO, A CORPORATION OF OHIO.

TRANSMISSION MECHANISM FOR MACHINE-TOOLS.

1,400,361. Specification of Letters Patent. Patented Dec. 13, 1921.

Application filed November 6, 1919. Serial No. 336,077.

*To all whom it may concern:*

Be it known that I, HOWARD W. HUNT, a citizen of the United States, and residing at Cincinnati, in the county of Hamilton and State of Ohio, have invented a new and useful Improvement in Transmission Mechanism for Machine-Tools, of which the following specification is a full disclosure.

This invention deals with improvements in the mechanism for effecting a quick change in any one of a plurality of directions and in any one of a plurality of different rates of travel, by a single lever or hand controller, and whereby a plurality of different species or kinds of transmission may be controlled, and for effecting in any one of a plurality of available directions, relative or opposing movements between a plurality of tool holders, and movement between the tool holders and supporting member, whereby the motion in any of the directions of one may be reversed or stopped quite independently of the other.

Another object is to simplify the manipulation of the tool feed controlling mechanism by so arranging the lever or levers that the direction in which they slant will designate the type of drive in action governing a rate of movement and in which the direction of arc swing of the lever while changing from one speed setting to another will control the direction of feed.

Another object within the contemplation of this invention is to simplify the construction of the feed or speed change mechanism so that the attendant may cause the tool holder or traversing mechanism to feed or traverse in the predetermined direction at any desired one of a multiplicity of available rates by the manipulation of a single lever or hand controller, or he may either stop or reverse the direction of travel by manually shifting the same lever.

Another object is to arrange said mechanism in such a way that two or more parts thereof cannot function simultaneously in such a manner as to cause their damage or destruction.

Another object is to so arrange the members moved by the operator for the purpose of controlling the mechanism, that the position of the said control members, or the direction in which they are moved into said position, will indicate the nature and direction of the movement of the mechanism.

Another object is to so arrange the mechanism that the operator may cause any desired tool supporting member to move in any desired manner or stop or alter its motion by suitable manipulation of a single control member.

Another object is to create a new arrangement with respect to the location of the various control members so as to bring control of the movement of various tool supporting members within the immediate reach of the operator at a convenient central station.

Another object is to so arrange the mechanism that the movement of the control member controlling a portion of the mechanism, for the purpose of causing a tool supporting member to be traversed by mechanical power, will disengage any portion of the feed mechanism, whose simultaneous action would cause damage to either mechanism, while a movement for the stoppage of such power traverse, will reëngage the said portion of the feed mechanism.

Another object is to provide a means whereby the operation of the power rapid traverse mechanism will not cause any part of the hand operated traverse mechanism to move in such a manner as to cause danger to the operator.

Another object is to provide a means whereby the tool or tools, or their supporting member or members may be traversed by mechanical power while the machine itself is not performing its regular cycle of operation.

Other objects will be obvious from the following description of the accompanying drawings, made a part hereof, and from the following description of the invention. The invention accordingly consists in the features of construction, combination of parts, and their relation to one another, all as more completely outlined herein.

In the drawings which illustrate a preferred embodiment of the invention like characters of reference denote corresponding parts throughout the several views, of which.

In certain classes of machine tools, it is necessary to move the cutting tool or tools, and the member or members supporting the same, a small distance during each cycle of operation of the machine, or during some portion of this cycle, such movement being termed the feed, and the mechanism for causing it is termed the feed mechanism. It is also necessary to move the cutting tool or tools, and the member or members supporting the same, from place to place, so that they may be caused to operate on the proper part of the work, such a movement being termed the traverse. This latter motion bears no relation to the cycle of operation of the machine. In order to save time, the movement of traverse should be performed rapidly, and at a rate many times greater than that employed for the feed. When the parts to be moved are heavy, requiring considerable power for their rapid movement, it is desirable that they shall be moved by mechanical power and that this mechanical power be manually controlled by the operator. A means for applying and controlling mechanical power, for the purpose of rapidly traversing a tool supporting member, is termed a power rapid traverse mechanism. In the construction usually employed, portions of the feed mechanism also function as portions of the rapid traverse mechanism.

Referring to the drawings, 1 indicates the cross rail, commonly called "the rail", of a metal planing machine, upon which the tool supporting members are slidably gibbed and moved longitudinally by a feed screw.

In the arrangement shown in the drawings, provision is made for traversing or feeding a plurality of tool supporting members, although my invention is equally applicable to a machine tool in which only a single tool supporting member is employed or provided.

When a plurality of tool supporting members are provided, it is desirable to traverse or feed each member independently of the others. In order to enable each tool to be traversed or fed independently of the others, both as regards direction of movement and amount of feed, an independent shaft or feed screw must be provided for each tool supporting member, requiring a duplication of parts, but a detailed description of only one of the units is given herein.

The construction shown being employed for operating two tool supporting members, two feed screws or shafts 2 and 3 are provided, suitably journaled within the rail. One end of each shaft projects beyond the end of the rail, so that a clutch may be mounted thereon. The third feed shaft 4 is journaled within the rail parallel to and between the feed screws or shafts 2 and 3, likewise having one end of the shaft projecting beyond the end of the rail, upon which the clutch for driving said shaft is mounted. These three shafts are arranged parallel to each other, to the face of the rail, and to the line of travel of the tool supporting members sliding upon the rail.

In order to feed the tools, the shafts 2, 3, and 4 are rotated intermittently in the desired direction by means of any suitable mechanism, the one usually employed being substantially as follows:

A reciprocating rack member 5 extends from the base of the machine upwardly to the back of the rail and is reciprocated in any well-known manner by suitable motion converting devices. This rack 5 meshes with a pinion 6, mounted upon a shaft 7 suitably journaled in bearings fixed to the back of the rail.

The gear 8 is fixed upon the shaft 7, rotates with the gear 6, and meshes with an intermediate gear 9, rotating upon a shaft 10, supported by the casing 11, which is secured to the end of the rail. The gear 9 meshes with a gear 12, concentric with shaft 4, which meshes with corresponding gears 13 and 14 concentric with shafts 2 and 3. Thus the gear 12 serves as the intermediate gear of a train for transmitting motion respectively to the shafts 2 and 3. These gears 12, 13 and 14 rotate their respective shafts by means of suitable ratchet and clutch mechanisms, which are duplicated for each shaft, and which are described for the shaft 4.

Figure 1:
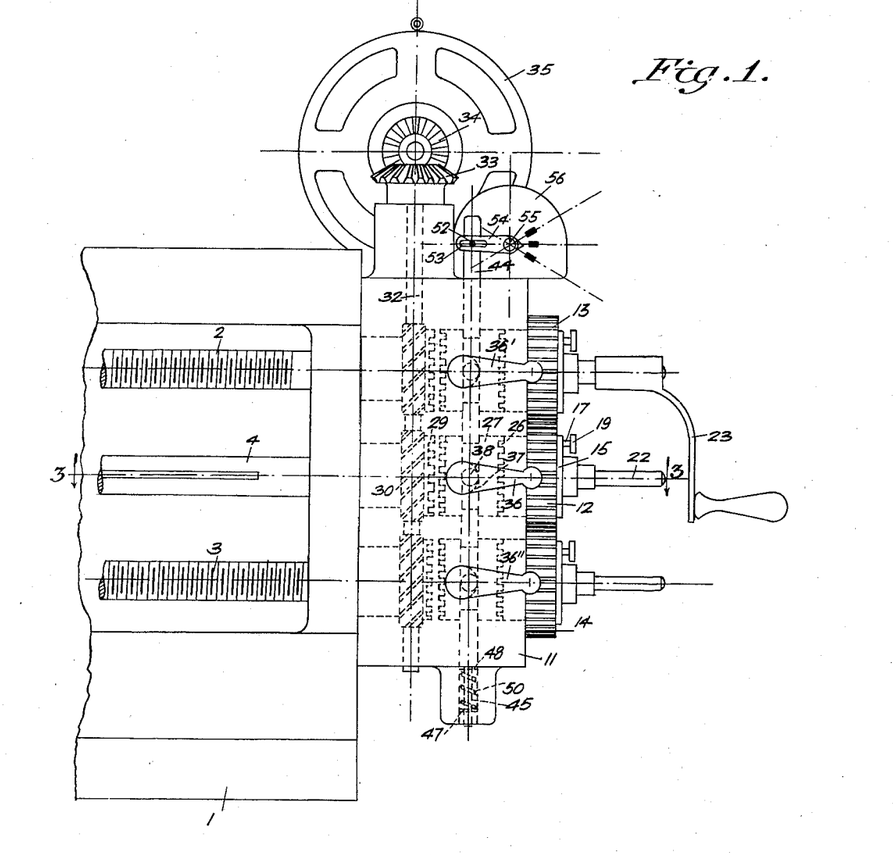
Figure 1 is a front elevation of my improved gearing and control for machine tools, shown as applied to the rail of a planer having a plurality of tool holders.
Figure 2:
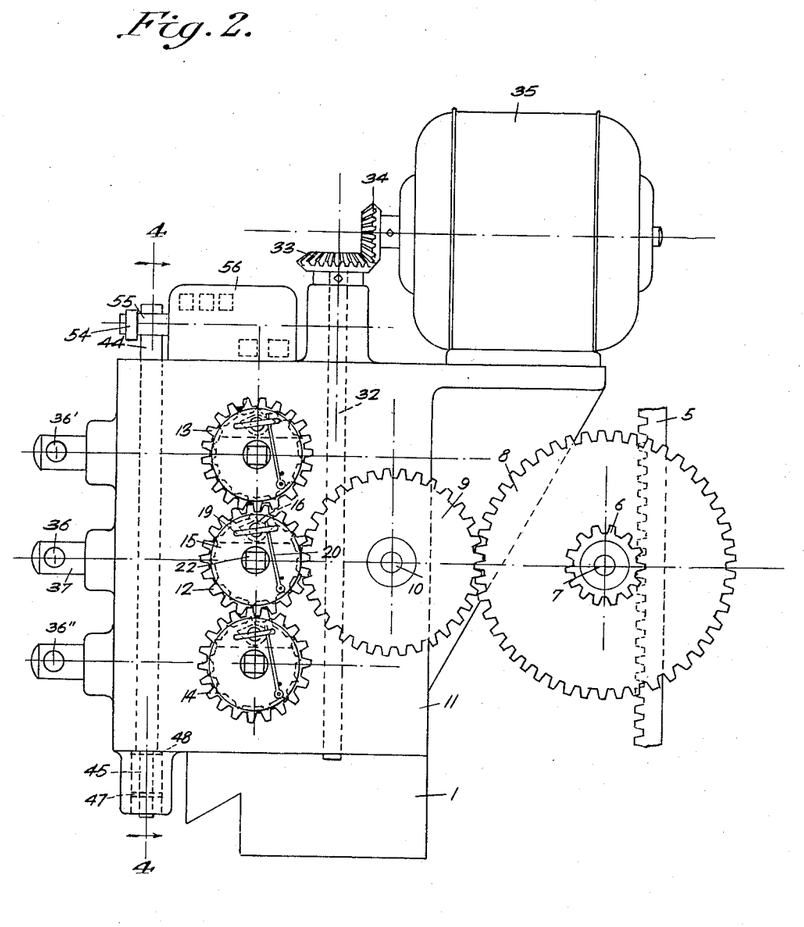
Fig. 2 is an end elevation thereof.
Figures 3, 4, 7, 8, 9, 10:
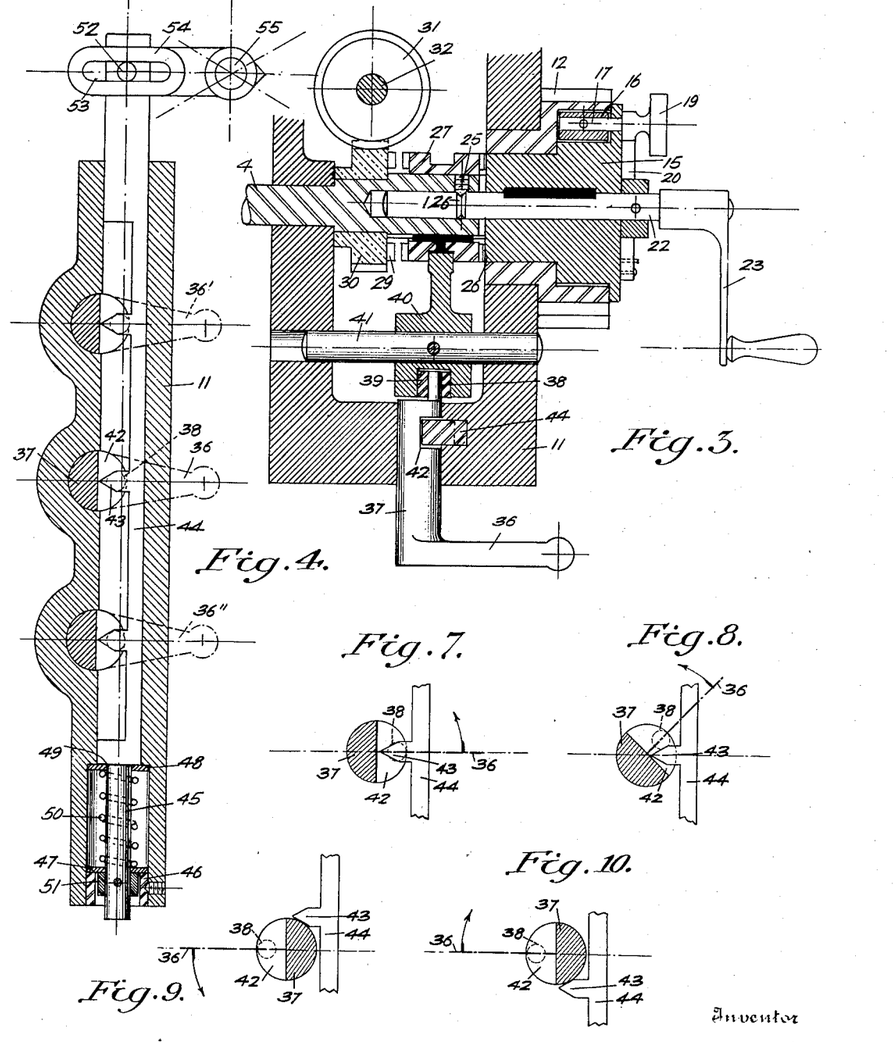
Fig. 3 is a section on line 3, 3, Fig. 1.
Fig. 4 is a vertical section taken on line 4, 4, Fig. 2.
Figs. 7, 8, 9, are diagrammatic sections showing the successive operating positions of the controller rod tooth relative to the notch of the crank shaft to raise the controller rod.
Fig. 10 is a similar view showing the controller rod in its lower position.
Figure 5:
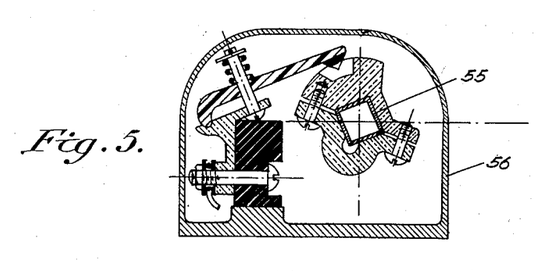
Fig. 5 is a transverse section through the switch.

The gear 12, as shown in Fig. 3, is counterbored to receive the ratchet carrying hub 15, the cylindrical surface of the counterbore being notched or toothed, so as to form an internal ratchet to engage and drive the double ended pawl 16, mounted upon a pin 17, which is journaled in the hub member 15. The pin 17 is provided with a knob 19 for manually setting the pawl, so that either end thereof may engage the internal ratchet, in order to control the direction of rotation of the feed shaft. This pawl is held in the desired position by a flat spring 20, which presses against one or the other of two flat surfaces formed on the knob, while its opposite end is fixed to the hub member 15. This form of construction of the ratchet feed is old and well-known to the art.

The gear 12 is normally loose upon the hub member except when engaged by the pawl, and as the gear rotates alternately in a forward and reverse direction with the reciprocation of the rack 5, it will intermittently rotate the hub member in an appropriate direction, the direction of rotation depending upon the position of the double ended pawl 16. Thus, forward or reverse intermittent motion may be imparted to the hub member 15 at the option of the operator. The hub member 15 is keyed to a shaft 22 concentric therewith and also with the shaft 4. One end of shaft 22 projects beyond the hub member and is squared in order to be turned manually by the removable crank 23, in order to traverse the tool. The other end of the shaft 22 projects into a hole bored in the enlarged end of shaft 4, and is held in place by set screw 25 which enters the annular groove 126, turned in shaft 22, so that the shaft 22 does not rotate shaft 4 but cannot move endwise with reference thereto. Hub member 15 has formed upon it clutch teeth 26 adapted to engage the sliding clutch member 27, which is splined to the enlarged end of shaft 4. The opposite face of clutch member 27 is provided with clutch teeth adapted to engage with clutch teeth 29, projecting laterally from the spiral gear 30, loosely journaled upon shaft 4 and meshing with spiral gear 31, fixed upon a vertical shaft 32, extending at right angles to shaft 4. The shaft 32 is driven by an electric motor or other suitable source of power and is journaled in bearings formed in casing 11. In the construction shown, the shaft 32 has keyed to its upper end the bevel gear 33 meshing with a bevel gear 34, fixed upon the shaft of the electric motor 35 which is mounted upon the top of casing 11.

With the clutch 27 in the position shown, the rotation of the hub member for the purpose of feeding by the gear 12, or for the purpose of traversing by crank 23, will cause the clutch 27 to rotate shaft 4 and move the tool supporting member. With the clutch member 27 moved to the left, the rotation of the hub member 15 by the feed mechanism or by the crank 23, will not cause the rotation of shaft 4 and neither will the rotation of shaft 4 cause the rotation of the feed mechanism or of the crank 23, which would be objectionable, since the forcible rotation of the feed mechanism by the shaft 4 would cause damage, and the forcible rotation of crank 23 would be dangerous to the operator.

With the clutch 27 engaging with the gear 30, the rotation of the motor 35 will cause the rotation of shaft 32, gear 31, gear 30, clutch 27 and shaft 4, causing the tool supporting member to be traversed in one direction or the other in accordance with the direction of rotation of the motor.

The rotation of the motor 35 and the position of the clutch 27 are controlled by the action of the single lever 36, one such lever being provided for each of the shafts 2, 3 and 4, adapting the shafts to be alternately and independently thrown into driving connection with either the feed mechanism or with the power rapid traverse mechanism. The lever 36 is provided with a cylindrical extension 37 journaled within the casing 11 and having an eccentric pin 38 projected from the end thereof. The eccentric pin 38 carries a roller 39 engaging a groove in the clutch shifting member 40, which is pinned to a rod 41, slidably mounted within the casing 11, a yoke portion of the clutch shifting member engaging with an annular groove formed in the periphery of the clutch member 27. Thus when the lever 36 is rotated 180° or somewhat less about the axis of this cylindrical extension, it will shift the clutch from the position shown, where it engages the hub member 15, into engagement with the spiral gear 30; and when lever 36 is in such new position and is rotated back to its initial position, it will shift the clutch from engagement with spiral gear 30 back into engagement with hub member 15. The position of the lever 36 will thus indicate whether shaft 4 and the tool supporting member controlled thereby is in operative connection with the feed mechanism or with the power traverse mechanism.

The cylindrical extension 37 of the controlling lever 36 is provided with the rectangular groove 42 so that at this point approximately one half of the section is cut away forming a clearance way for a tooth or dog 43 projecting laterally from the rod 44 which actuates the mechanism operating the motor controlling and reversing switch. If some other source of power be employed, this rod would actuate the mechanism controlling the application of power to shaft 32. The rod 44 extends vertically and is slidably mounted within a bore in the casing 11 and at its lower end is a stem extension 45 projecting beyond the casing. Fixed into the end of a counterbore in the casing is the collar 46 through which the stem 45 projects, said collar providing a stop against which washer 47, slidable upon and concentric with stem 45, bears. Washer 47 also bears against collar 51 pinned to stem 45. A second washer 48 slidable upon and concentric with stem 45, bears against the shoulder 49 of the rod 44 and also against the shoulder formed by the bottom of the counterbore, through which the actuating rod 44 extends. A spring 50 concentric with the stem 45 is interposed between the washers 47 and 48. The raising of rod 44 causes the collar 51 to raise washer 47 compressing the spring, washer 48 then bearing only against the bottom of the counterbore. The lowering of rod 44 lowers washer 48, and also compresses the spring, since washer 47 then bears only against collar 46. With rod 44 in the position shown, no force is exerted by the spring to move the rod in either direction.

To the upper end of rod 44 is fixed a pin 52 engaging in the slot 53 formed in the lever arm 54 fixed to the switch shaft 55, which is journaled in the switch casing 56 mounted upon the top of the casing 11. The switch mechanism may be of any type of motor controlling and reversing switch of standard or commercial manufacture. The nature of the mechanism of the motor control switch is such that the motor is not energized when the lever 54 is in a horizontal position, which position it assumes automatically when the action of handle 36 permits the rod 44 to be returned to its normal position by the action of the spring 50. When, however, rod 44 is pulled down by the rotation of lever 36, the switch will cause the motor to be energized in such a manner as to rotate in a certain direction. If, on the other hand, rod 44 be raised by the rotation of lever 36 in the opposite direction, the switch will cause the motor to be energized in such a manner that it will rotate in the opposite direction. I prefer to connect the motor in such a manner that a downward movement of lever 36 will cause the tools to move downwardly and an upward movement of the lever will cause them to move upwardly.

As shown in Fig. 4, each of the three levers 36, 36' and 36", controlling respectively the clutches mounted on shafts 4, 2 and 3, is in a horizontal position and directed toward the right, indicating that the three shafts 4, 2 and 3 are operatively connected with their respective feed mechanisms. The rotation of lever 36 in a clockwise direction will cause clutch 27 on shaft 4 to be shifted to the left, disengaging shaft 4 from the feed mechanism and causing it to be operatively connected with gear 30, transmitting power from the motor to traverse the tool. At the same time, the half round section of the cylindrical extension 38 will engage the tooth 43, forcing rod 44 downward, throwing the switch and energizing the motor in such a manner that shaft 4 is caused to rotate so as to traverse the tool which it controls, in a downward direction. The return of lever 36 to its initial position permits the spring 50 to raise the rod 44, throwing the switch to its neutral position and stopping the motor, and also shifts the clutch 27 from engagement with gear 30 into engagement with hub 17, reëstablishing operative connection between shaft 4 and the feed mechanism.

Corresponding Fig. 7 shows the hand lever set in the same position shown for the hand levers of the series Fig. 4.

Now referring to Figs. 8 and 9, assume that it is desired to alternate from one species of drive to the other, accomplished by moving the hand lever from its extreme right position to its extreme left position; if the arc of motion of the hand lever is on the upper side of a diametric horizontal line, as indicated by arrow in said figure, the half round section of the crank shaft 37 will engage the tooth 43 of the controller rod 44 from beneath, raising the rod 44 against the tension of the spring 50 with the washer 48 as a stationary element or abutment for the spring. Upward motion of the rod 44 rocks the switch arm 54, throwing the electric switch, say for motor reverse direction.

A movement of the hand lever 36 in an arc from right to left below the diametrical horizontal line (see Fig. 10) will cause the flat side of the half round section of the crank shaft 37 to engage against the upper side of the tooth of the controller rod 44, moving the rod downwardly, throwing the switch arm 54 in an opposite direction for a forward motor control. As the controller rod 44 moves downwardly it carries with it the washer 48 compressing the spring 50 against the washer 47 as an abutment whereby the spring pressure will lift the controller rod as soon as its tooth is disengaged from the crank shaft.

Figures 6, 11, 12, 13, 14:
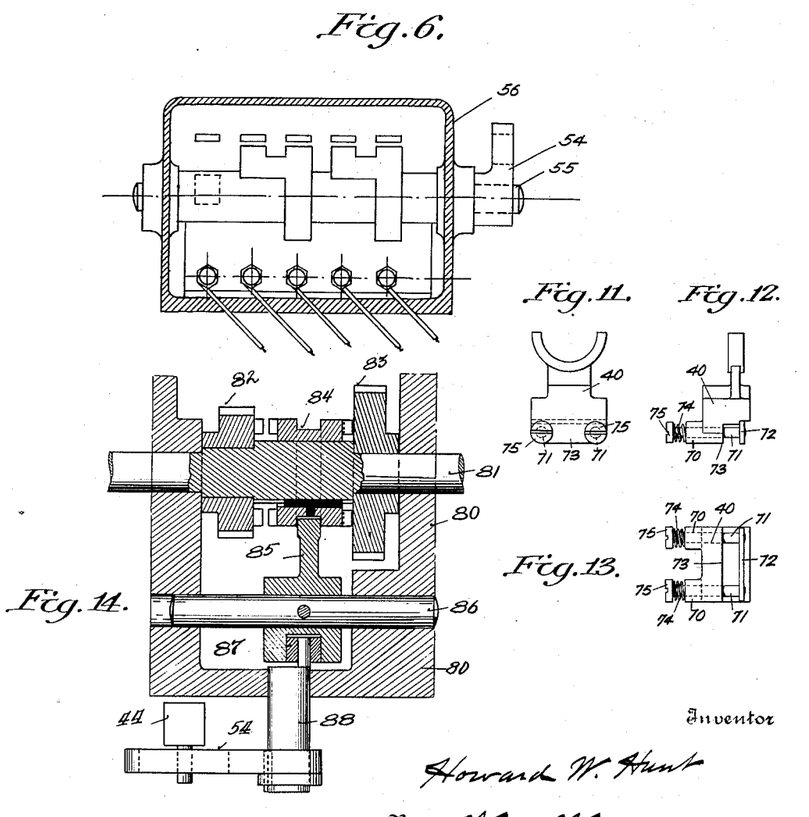
Fig. 6 is a vertical section of the same.
Figs. 11, 12 and 13 are respectively a side, end and bottom plan of a modified form of clutch shifting member.
Fig. 14 is a view similar to Fig. 3, showing a modified arrangement.

In Figs. 11, 12 and 13 a modified form of clutch shifting member 40 is illustrated, providing for a compensating or yielding connection between the eccentric pin 38 and its roller 39 and the clutch shifting member to accommodate for a non-movement of the clutch, due to the disalinement of the opposing teeth causing the tooth faces to be abuttingly brought together until in intermeshing registration, whereupon the clutch shifting member will be forcibly thrown in the direction of shift.

The clutch shifting member 40 is provided with a pair of boss extensions 70 opposite its yoke end, providing supports for the slide rods 71—71, slidably engaged through said bosses respectively and connected together by a strap or cross bar 72. The roller 39 on the eccentric stud 38 of the crank shaft 37, engages between the cross bar 72 and the adjacent face of the cross web 73 joining the bosses.

Each of the rods 70 is provided with a spring 74 interposed between the head 75 of the rods and end of the boss respectively for forcing the cross bar 72 toward the web 73. Thus, when the roller 39 actuates the cross bar 72 it will carry with it the yoke arm unless motion of the yoke arm should be arrested by a tooth abutting engagement of the clutch members, which would result in compressing the springs and allowing the hand lever 39 to be fully thrown, and as soon as the clutch teeth of the opposing clutch members are brought into intermeshing registration by the rotation of one of the members, when the yoke arm and clutch member would snap into place.

This type of device is only required for throwing the clutch into mesh with the hub member 15 on account of its idle periods, which periods may occur at the time of making the shift. Where one of the clutch members is rotated, the clutch connection between the crank and yoke arm is not absolutely essential.

The above described mechanism may be modified in a great number of ways without affecting the nature of the functions to be performed or the essential relations of the several members performing them. It is therefore not intended to confine the invention to the particular construction described, but to include all forms of construction coming within the scope of the appended claims.

It is desirable primarily to use an electric motor for the quick-traversing feed, in which instance, as heretofore described, a reversing switch for stopping, forward and reverse motor control is employed and referred to as a "controller." The term "controller," however, is not necessarily intended to be restricted to electro-mechanical means as solely mechanical means may be employed. A type of such controller is shown in Fig. 14, being to a degree a duplication of the gearing and clutch mechanism shown in Fig. 3.

Referring to Fig. 14, 80 indicates a casing or frame, journaling a driving shaft 81 in driving connection with the high-speed shaft 32 or it may represent said shaft 32. 82—83 represent respectively forward and reverse rotating gears loosely mounted on said shaft 81 adapted to be alternately connected to the shaft 81 by the sliding clutch member 84. The gears 82 and 83 may be driven from any suitable source. The clutch member is shifted by a yoke arm 85 fixed on a rod 86 mounted in the frame 80 and has a slotted end into which the roller 87 on the end of the crank rod 88 engages. The crank rod 88 is fixed to the lever 54 actuated by the rod 44 in substantially the same manner as heretofore described for rocking the shaft 55 of the motor controlling and reversing switch.

Figure 15:
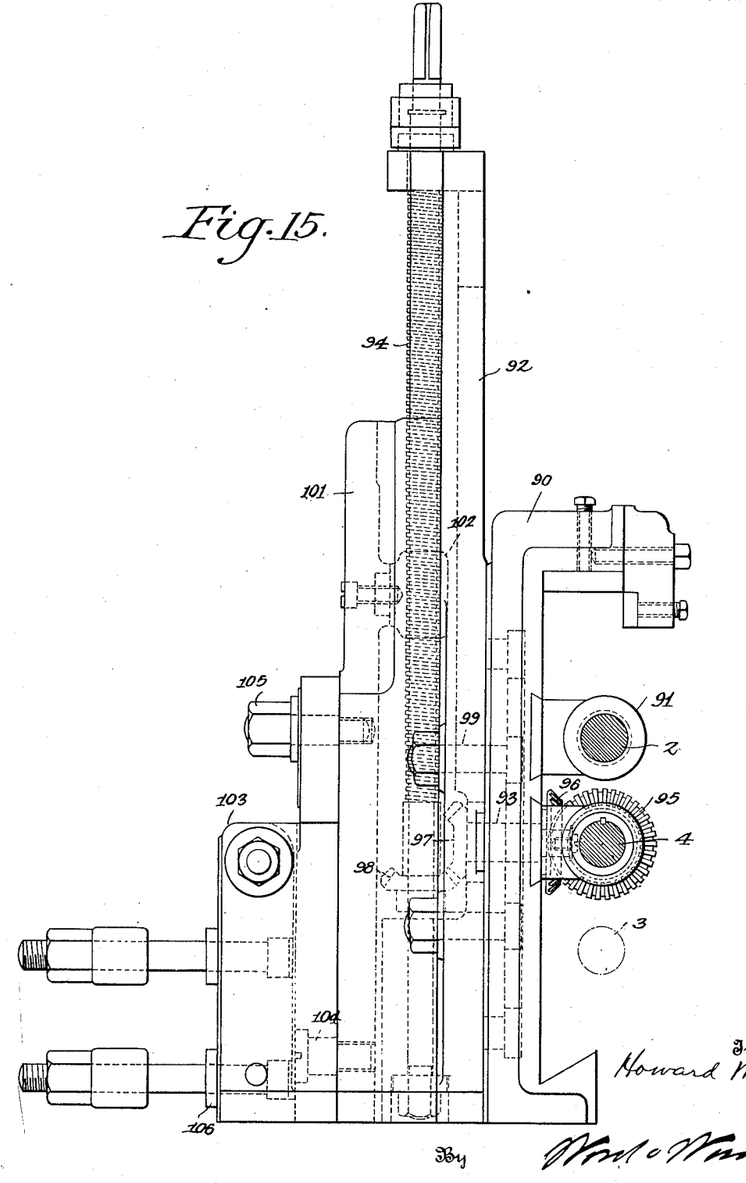
Fig. 15 is a side elevation of a tool-holding head and saddle for connecting the head to the cross-rail of a planer for which the feed controlling mechanism of the present invention is particularly adaptable.

In Fig. 15 a conventional form of tool-holding head is illustrated, consisting of a saddle 90 slidably gibbed upon the cross rail 1 and translated upon the cross rail by cross feed screw 2, through a nut 91, fixed to the saddle. In the event of two tool holding heads, as a right and left, are carried by the cross rail 1, the other would be translated upon the rail by the second feed screw 3.

The construction of the heads are duplicates of each other and it is, therefore, that reference thereto is only made in the singular.

A tool slide rest 92 is mounted to swivel upon the saddle about an axis represented as an intermediate shaft 93, connecting the main feed shaft 4 with the vertical feed screw 94 journaled upon the slide rest 92. A bevel gear 95, carried with the saddle, is splined upon the shaft 4 and is in mesh with a bevel gear 96, on the inner end of the shaft 93. A gear 97 is fixed to the outer end of said shaft 93, meshing with a gear 98 fixed upon the feed screw 94. The slide rest is rotatable, about its axis, for different angular adjustments, and is locked in position by the lock bolts 99. The feed screw 94 can be rotated manually by applying a crank handle upon the squared upper end of the screw projecting beyond the bearing 11 of the slide rest 92. The slide rest is provided with the usual guides upon its front face for slidably supporting the tool slide 101, having a nut 102 engaged with the feed screw 94. The tool slide 101 is provided with a tool-holder, comprising a clapper-box 103, adapted to swivel about a pivot as screw 104 is threaded into the tool-slide 101 and the clapper-box is held secure in any adjusted position by the set screw 105 engaged into the tool slide. The clapper-box carries a swinging apron or clapper 106, to which a cutting tool is clamped.

For the purpose of the present invention, the saddle and slide rest may be designated as a traversing tool supporting member and the tool slide clapper-box and clapper as a tool holder translatable upon the tool supporting member. The feed shaft 4 transmits motion to the feed screw of each tool supporting member mounted upon the cross rail when a plural number is used, a clutch being used for connecting the gear 95 to the feed shaft 4, or the gear arranged to be slid into and out of engagement with the gear 96. A separate feed screw, as 2 or 3, being preferably employed for each tool head.

Having described my invention, I claim:

1. In a machine tool, a traversing tool supporting member, a tool holder translatable upon said tool supporting member, a shaft for traversing the said tool supporting member, a shaft for translating said tool holder, a reversible power transmission means for rotating said shafts, a controller for reversing said power means, clutches for said shafts for respectively connecting and disconnecting the same with said power transmission means, means for actuating said controller, and clutch actuating means for each clutch coöperating with said controller actuating means for simultaneous clutch and controller actuation.

2. In a machine tool, a traversing tool supporting member, a tool holder translatable upon said tool supporting member, a shaft for traversing said tool supporting member, a shaft for translating said tool holder, a reversible power transmission means for rotating said shafts, a controller for reversing said power means, means for actuating said controller, and clutches for said shafts for respectively independently connecting and disconnecting said shafts with said transmission means, and coöperating with said controller actuating means for simultaneous clutch and controller actuation.

3. In a machine tool, a traversing tool supporting member, a shaft for traversing said tool supporting member, reversible power transmission means for rotating said shaft, a controller for reversing said power, means for actuating said controller, and a clutch for connecting and disconnecting said shaft and said power transmission means, coöperating with said controller actuating means for simultaneous clutch and controller actuation.

4. In combination, a tool supporting member, means for moving the tool supporting member intermittently, means for moving said member continuously, a source of power transmittively connected with the said means for moving the tool supporting member continuously, means for controlling and reversing the direction of action of the power, means for transmittively connecting the tool supporting member alternately with the said intermittently or continuously moving means, a manually operated control mechanism adapted to simultaneously operate the said means for controlling the power and the said means for transmittively connecting the tool supporting member alternately with the said intermittently or continuously moving means.

5. In combination, a tool supporting member movable in two or more directions, a plurality of means, one for moving the tool supporting member intermittently in each of these directions, a plurality of means, one for moving the tool supporting member continuously in each of these directions, a source of power transmittively connected with each of the said continuously moving means, means for controlling and reversing the direction of action of the power, a plurality of means, one for transmittively connecting the tool supporting member alternately with each of the corresponding intermittent or continuously moving means aforesaid, and a plurality of manually operated control members, one for each of the said alternate transmission connection means, and adapted to simultaneously operate the said means for controlling the power, and the associated alternate transmittive connection means aforesaid.

6. In combination, a movable tool supporting member, a clutch member adapted to move intermittently, a clutch member adapted to move continuously, a reversible source of power transmissively connected with the said clutch member, adapted to move continuously, a controller for controlling and reversing the said source of power, a clutch adapted to engage alternatively with the said clutch member, transmission mechanism adapted to transmit motion from the said clutch to the said tool supporting member, and means transmittively connected with said clutch and said controller for simultaneous clutch and controller actuation.

7. In combination, a movable tool supporting member, a clutch member adapted to move slowly, a clutch member adapted to move rapidly, a reversible source of power transmittively connected with the said clutch member adapted to move rapidly, a controller for controlling and reversing the said source of power, a clutch adapted to engage alternatively with the said clutch members, transmission mechanism adapted to transmit motion from the said clutch to the said tool supporting member, and means transmittively connected with said clutch and said controller, for simultaneous clutch and controller actuation.

8. In a machine tool, a support, a tool supporting member translatable upon said support in alternate directions, an electric motor, transmission mechanism connecting said motor and tool supporting member, including a clutch for controlling the driving connection with said tool supporting member, a motor reversing controller for starting, stopping and reversing the motor, and a manually operated control member for simultaneously operating said clutch and motor controller.

9. In a machine tool, a support, a tool supporting member translatable upon said support in alternate directions, a shaft for transmitting motion to translate said tool supporting member, an electric motor and transmission means for imparting a constant driving motion to said shaft, the transmission means including a clutch element for motion control with said shaft, transmission means for imparting an intermittent motion to said shaft, including a clutch element for motion control with said shaft, a movable clutch element for said shaft, adapted to be alternately connected with either of said aforesaid clutch elements, a motor reversing controller for said motor, and a manually operated control member connecting with said controller and movable clutch element for simultaneous controller and clutch control.

10. A mechanism of the nature disclosed, combining a plurality of parallel shafts, a gear loosely mounted on each shaft respectively, a clutch member for each gear for connecting the gear to its shaft, an electric motor, transmission for connecting said motor and gears, a motor controlling and reversing switch, an actuating member for operating said switch, and a clutch actuating member for each clutch coöperating with said actuating member for simultaneous motor and shaft transmission control.

11. A mechanism of the nature disclosed, combining a shaft, a gear loosely mounted on said shaft, a clutch for connecting the gear to said shaft, an electric motor transmittively connecting with said gear, a motor controlling and reversing switch, an actuating member for operating said switch, and clutch throwing means coöperating with said actuating member for simultaneous motor and shaft control.

12. A transmission control of the nature disclosed combining a driven member, a reversible motion driving member, transmission elements connecting said driven and driving members, a clutch for controlling the motion to said driven members, a controller for said reversible driving member, a clutch actuator and a controller actuator coöperatively connecting with said clutch actuator for simultaneous control of said clutch and controller.

13. A transmission mechanism of the nature disclosed, combining a plurality of driven members, a reversible driving member, transmission elements connecting said driven and driving members, a clutch for each driven member for transmission control, a controller for said reversible driving member, a clutch actuator for each clutch, and a controller actuator operatively connecting with said clutch actuators of the series for simultaneous control of any one of the clutch actuators of the series and said controller actuator.

14. A transmission mechanism of the nature disclosed, combining a driven member, reversible driving means in transmitting connection with said driven member, a clutch for connecting and disconnecting said driven member from said driving means, a controller for said reversible driving means, clutch and controller actuating means for simultaneous clutch and controller actuation, and when moved in one way it will operate said controller for one direction control, and when moved in another way it will operate said parts for a reverse direction control.

15. A transmission mechanism of the nature disclosed, combining a driven member, reversible driving means for operating said driven member in alternate directions, a clutch for connecting said driving means and driven member, a controller for said driving means, an actuating member for said controller, a manually operated member for operating said clutch and adapted to be connected with said controller actuating member, whereby when moved in one way for throwing said clutch, connecting said driving means and driven member, it will operate said controller actuating member for one direction control, and when moved in another way it will operate said controller actuating member for a reverse direction control.

16. A transmission mechanism of the nature disclosed, combining a driven member, a reversible driving means for operating said driven member in alternate directions, a clutch for connecting said driving means and driven member, a controller for said driving means, an actuating member for said controller automatically movable to a normal position, a manually operated member for operating said clutch and adapted to be connected with said controller actuating member, whereby when moved in one way for throwing said clutch, connecting said driving means and driven member, it will operate said controller actuating member for one direction control and when moved in another way it will operate said controller actuating member for a reverse direction control.

17. A transmission mechanism of the nature disclosed, combining a driven shaft, a gear on said shaft, reversible driving means connecting with said gear, a clutch member on said shaft connecting said gear and shaft, a controller for said driving means, an actuating member for said controller, a manually operated member for throwing said clutch and operating said actuating member and movable in alternate ways for throwing said clutch in gear and shaft connection, whereby in one way it will operate said controlling actuating members for one direction control and in the other way for reverse control.

18. A transmission mechanism of the nature disclosed, combining a driven member, reversible driving means for operating said driven member in alternate directions, a clutch for connecting said driving means and driven member, a controller for said driving means, an actuating member for said controller, a manually operated member for operating said clutch and adapted to be connected with said controller actuating member, whereby when moved in one way for throwing said clutch, connecting said driving means and driven member, it will operate said controller actuating member for one direction control, and when moved in another way it will operate said controller actuating member for a reverse direction control.

19. A transmission mechanism of the nature disclosed, combining a plurality of driven shafts, reversible driving means connecting with said shafts, a clutch member, one for each of said shafts, for selectively connecting said driving means and shafts, a controller for said driving means, an actuating member for said controller, a manually operated member, one for each clutch, operating said actuating member and movable in alternate ways for throwing said clutch in a transmitting position, whereby in one way it will operate said controlling actuating members for one direction control and in the other way for reverse control.

20. A mechanism of the nature disclosed, combining a driven shaft, an intermittently driven gear for said shaft, a constantly driven gear for said shaft, a clutch for alternately connecting said gears to said shaft, a power controller for said constantly driven gear, and clutch and power controller actuating means for simultaneously operating said clutch and controller.

21. A mechanism of the nature disclosed, combining a driven shaft, an intermittently driven gear for said shaft, a constantly driven gear for said shaft, a clutch for alternately connecting said gears to said shaft, a power controller for said constantly driven gear, means for actuating said clutch, means for actuating said controller, said clutch and controller actuating means coöperating in the control of said clutch connecting said constantly driven gear and shaft.

22. A mechanism of the nature disclosed, combining a driven shaft, reversible transmission means for said shaft, including a clutch for connecting with said shaft, a clutch actuator for controlling said clutch, means for reversing said transmission means, connecting with said actuator and operable thereby in alternate controlling directions for reversible transmission control.

23. A mechanism of the nature disclosed, combining a driven shaft, an intermittently driven gear for said shaft, a constantly driven gear for said shaft, a clutch for alternately connecting said gears to said shaft, a power controller for said constantly driven gear, and clutch and power controller actuating means for simultaneously operating said clutch and controller.

In witness whereof, I hereunto subscribe my name, as attested by the two subscribing witnesses.

HOWARD W. HUNT.

Witnesses:
L. A. BECK,
M. BARRON.